3,114,716
METHOD OF PREPARING RADIOACTIVE CESIUM SOURCES

Thomas C. Quinby, Kingston, Tenn., assignor to the United States of America as represented by the United States Atomic Energy Commission
No Drawing. Filed Dec. 28, 1962, Ser. No. 248,167
6 Claims. (Cl. 252—301.1)

My invention relates to radiation sources and more particularly to a method of preparing radioactive cesium sources.

The radiation characteristics of the fission product isotope cesium 137 are favorable to its use for numerous purposes, including applications requiring high levels of activity, e.g., as a high-level radiation source or as a heat source in thermoelectric generators. One of the problems presented in the use of this isotope for heat-source applications is the provision of source material having physical and chemical properties suitable for safe, trouble-free operation for extended periods. The desired properties include a high melting point, low vapor pressure at the fusion temperature, chemical inertness and low solubility in water. These properties provide a safety factor by preventing dispersion of radioactivity to the surrounding environment in the event of failure of the source container. Cesium chloride, which has been satisfactorily employed in pellet form for applications involving moderate levels of activity, is not suitable for this purpose because of its high solubility in water.

Cesium sources with the desired physical and chemical properties have been prepared by incorporating the cesium as a component of a glass body. The preparation of cesium-bearing glass, however, has been beset with serious difficulties resulting from the volatility of cesium. For example, cesium-bearing silicate glass has been prepared by heating cesium carbonate with silica. At the temperature required for glass formation a substantial portion of the cesium is volatilized, resulting in decreased activity in the product as well as a severe contamination hazard in the glass-forming process. For heat-source applications it is desired to incorporate 40 to 60 weight percent cesium in the product glass. Minimizing of cesium volatility would assist in the attainment of high activity in the source and decrease the attendant radiation and contamination hazard.

It is, therefore, an object of my invention to provide a method of preparing radioactive cesium sources.

Another object is to provide a method of incorporating radioactive cesium into a glass having a high melting point, low vapor pressure at the fusion temperature, low solubility in water and chemical inertness.

Another object is to provide a method of preparing glass containing 40 to 60 weight percent cesium.

Another object is to provide a method of minimizing volatilization of cesium in the preparation of said glass.

Other objects and advantages of my invention will be apparent from the following detailed description and claims appended hereto.

In accordance with my invention a radioactive cesium source is prepared by suspending finely divided silica in an aqueous medium containing cesium values dissolved therein, adding a sufficient amount of sodium tetraphenyl boron to the resulting suspension to precipitate said cesium values, separating the resulting solid mixture from the remaining solution and converting said solid mixture to glass. A high-activity source containing up to 60 weight percent cesium and having the desired physical and chemical properties is prepared in this manner with minimized cesium volatilization of about 3 percent. This method and the required equipment are relatively simple and amenable to remote handling conditions, which are necessitated by the intense radiation fields involved.

I have found that precipitated cesium tetraphenyl boron when heated in intimate mixture with finely divided silica forms a cesium borosilicate glass with only slight volatilization of cesium. This precipitate, formed by reaction of sodium tetraphenyl boron with cesium in solution, is unique in its dual capacity to quantitatively remove cesium from solution and to form an insoluble glass in combination with silica.

Radioactive cesium values, normally in the form of a soluble salt such as cesium chloride, are provided in the starting aqueous solution. The concentration of cesium is not critical, but about 5 grams cesium per liter is preferred to provide a convenient volume of solution. The usual source of radioactive cesium is a decayed fission-product waste solution obtained by chemical reprocessing of irradiated nuclear reactor fuel. Cesium in this type solution is principally in the form of cesium 137, with varying proportions of cesium isotopes of atomic weights 135, 134 and 133, depending on the irradiation history and decay time of the cesium.

Cesium values are normally recovered from fission-product solution by co-crystallization with ammonium alum, and are subsequently converted to a cesium chloride solution. Although not critical to my invention, conversion of the cesium-bearing alum to purified cesium chloride may be effected by means of the following procedure: Cesium alum is first obtained by repeated fractional crystallization of the ammonium-cesium alums. The cesium alum is then slurried in a 1 N hydrochloric acid solution, and cesium is precipitated as cesium chloroplatinate by the addition of chloroplatinic acid. The cesium chloroplatinate is reacted with hydrazine hydrate to produce insoluble platinum metal, leaving cesium chloride in solution along with ammonium chloride. The solution may then be evaporated or treated with acid to remove the ammonium chloride. The cesium concentration and the pH may then be adjusted as desired. A neutral pH is preferred.

Finely divided silica is added to the cesium-bearing solution to produce an aqueous suspension. Silica having a particle size within the range of 140 to 200 mesh (U.S. sieve series) is suitable for this purpose. The proportion of silica in the cesium-bearing suspension may be varied to provide the level of activity desired in the product. For high-activity sources, that is, about 15 to 21 curies per gram, a silica-to-cesium weight ratio of about 1:1 to 1:2 is employed. The physical and chemical properties of the product may also be controlled to a considerable extent by adjustment of the amount of silica. The melting point is increased with increasing amounts of silica, and varies from about 1000° C. to 1300° C. for the ratios given above. Likewise, the solubility and volatility of cesium decrease with increasing amounts of silica.

Cesium is precipitated by adding sodium tetraphenyl boron to the cesium-silica slurry. The use of this reagent is unique owing to its behavior in forming a very insoluble cesium-bearing precipitate with the capability of conversion to glass-forming material upon being calcined at a temperature such as 600 to 800° C. Sodium tetraphenyl boron, preferably in the form of an aqueous solution at a concentration of about 150 grams per liter, is added in an amount sufficient for quantitative precipitation of cesium, the stoichiometric ratio being one mole per mole cesium. In order to obtain a complete reaction, a slight excess of precipitant is preferred. Although not critical, a precipitation temperature of about 50° C. to 70° C. is preferred. At lower temperatures the precipitate is voluminous and more difficult to filter and at higher temperatures the precipitant tends to decompose. The cesium-containing suspension is agitated during precipitation to provide a homogeneous mixture.

The resulting cesium-bearing precipitate, in intimate mixture with the silica, is then separated from the aqueous phase. The method of separation is not critical, and conventional filtration may be employed. Any soluble salts may then be removed by washing with water. To facilitate subsequent processing the washed precipitate may be dried, e.g., by heating in air at a temperature of 150° C.

The resulting cesium tetraphenyl boron-silica mixture is converted to glass by heating to the melting point and cooling the melt obtained thereby. In the course of heating, the cesium-bearing precipitate is decomposed to produce cesium borate, which reacts chemically with silica in the formation of glass. Heating to the melting point may be conducted in a single step. It is preferred, however, to heat the mixture initially to a temperature high enough for complete decomposition of organic components, that is, about 600° C. to 800° C., and to blend the resulting oxides prior to heating to the melting point in order to distribute any segregated material. This procedure also serves to reduce the volume of solids in the high-temperature melting step. The molten mass obtained by heating is preferably held at the melting point for a period of about two hours to ensure removal of all gases and to produce a bubble-free glass. The melt is then cooled to form glass. In order to avoid crystallization, cooling to a temperature of about 450° C. to 500° C. is effected rapidly. A temperature decrease rate of about 200° C. to 300° C. per hour is suitable for this purpose. The glass may then be annealed by holding at a temperature of about 450° C. to 500° C. prior to cooling to room temperature.

The cesium-bearing glass may then be fabricated into sources of the desired size and shape by melting the glass in a mold and cooling as described above.

The product source incorporates a high proportion, i.e., up to 60 weight percent cesium, with a resulting high specific activity of up to 21 curies per gram. Aqueous solubility of the cesium values in the glass is low, less than one milligram cesium per square centimeter per day, and its properties provide assurance of safe use under extreme conditions for extended periods of time.

My invention is further illustrated by the following specific examples.

*Example I*

Two grams of 140–200 mesh silica was added to 500 milliliters of water containing 2.5 grams of non-radioactive cesium chloride and cesium 137 tracer. The silica was maintained in suspension by agitation and a solution of sodium tetraphenyl boron was slowly added at a temperature of 70° C. at a proportion equivalent to 20 percent in excess of stoichiometric for precipitation of cesium. The resulting mixture was cooled to room temperature and the solids were separated by filtration. Tracer analysis indicated 99.6 percent removal of the cesium from solution. The filter cake was washed to remove soluble material and dried in air at 150° C. The dried cake was transferred to a platinum crucible and heated to a temperature of 700° C. The solids were then melted by heating to 1150° C. for a period of 2 hours. The melt was then solidified by cooling. The resulting glass was clear and contained no visible bubbles.

*Example II*

160 milliliters of a fission product cesium chloride solution containing 5.60 grams cesium and 160 milliequivalents of hydrochloric acid was added to a precipitator vessel. The total activity of the solution was 141 curies. Finely divided (140–200 mesh) silica had already been added to the vessel in an amount equivalent to the cesium (5.60 grams). 160 milliliters of a 1 normal sodium hydroxide solution was then added to neutralize the HCl. The resulting solution was heated to 60° C. with agitation and 100 milliliters of a solution containing 15 grams sodium tetraphenyl boron was added to precipitate the cesium. The resulting solids were separated by filtration and were washed with water. The washed solids were then dried at room temperature for 1 hour. The dried material was heated in a furnace to 450° C. for one hour and then to 700° C. for one hour. The resulting calcined material was in the form of small lumps, which where then broken up in a conventional blender. The resulting particles were then placed in a graphite container and heated to 1200° C. for 3 hours to produce a melt. The melt was allowed to cool to 1000° C. for 30 minutes, to 900° C. for 2 hours, to 500° C. for 8 hours, and finally to room temperature. The product glass had a rough surface and contained crystalline material in the form of whitish inclusions, probably as a result of slow cooling. The crystalline material was then removed by heating to 1300° C. for one-half hour, cooling to 500° C. at a temperature decrease rate of about 200° C. per hour, annealing at 500° C. for 2 hours, and finally cooling to room temperature. After this treatment the surface of the glass was smooth, and no inclusions were observed. The product weighed 12.2 grams and had a cesium content of 40 weight percent. From measurements of off-gas and residual activity in process equipment it was determined that 3 percent of the cesium activity was lost in preparing the source. The activity level of the source was about 140 curies. The source was then subject to solubility testing as follows: The source (20 square centimeters in area) was leached in 400 milliliters of ocean water for 15 days at 25° C. The pH of the ocean water was 6.5. After leaching, the solution contained 2.0 curies of cesium 137. This is equivalent to a dissolution rate of 0.2 milligram per square centimeter per day. Samples taken throughout the experiment show the leach rate was constant up to 15 days.

It may be seen from the above that a high-activity source with low solubility may be prepared by the method of my invention without substantial volatilization of cesium.

The above examples are merely illustrative and are not to be understood as limiting the scope of my invention, which is limited only as indicated by the appended claims. It is also to be understood that variations in apparatus and procedure may be employed by one skilled in the art without departing from the scope of my invention.

Having thus described my invention, I claim:

1. The method of preparing a radioactive cesium-containing glass which comprises suspending finely divided silica in an aqueous medium containing radioactive cesium values dissolved therein, adding sodium tetraphenyl boron to the resulting suspension at a proportion of at least one mole per mole cesium, agitating the resulting reaction mass until said cesium values are precipitated, separating the resulting solids from the remaining mother liquor, heating said solids until said solids melt, and cooling the resulting molten mass whereby a glass body is obtained.

2. The method of claim 1 wherein the ratio of silica to cesium in said suspension is from about 1:1 to 1:2.

3. The method of claim 1 wherein said reaction mass is agitated at a temperature of 50° C. to 70° C.

4. The method of claim 1 wherein said solids are heated to a temperature of about 600° C. to 800° C. and the resulting oxides are blended prior to being heated to the melting point.

5. The method of claim 1 wherein said molten mass is maintained in a molten state for at least about 2 hours prior to being cooled.

6. The method of claim 1 wherein said molten mass is cooled to a temperature of about 450° C. to 500° C. at a temperature decrease rate of about 200° C. to 300° C. per hour.

No references cited.